United States Patent Office 3,639,606
Patented Feb. 1, 1972

3,639,606
METHOD FOR THE PREVENTION OR CURE OF OXALIC LITHIASIS, AND PHARMACEUTICAL COMPOSITIONS THEREFOR
Jean-Marie Melon, Paris, and Jean Thomas, Saint Mande, France, assignors of a fractional part interest to Laboratoires Sauba, Montreuil-sous-Bois, France
No Drawing. Filed June 15, 1970, Ser. No. 46,553
Claims priority, application France, June 24, 1969, 6921210
Int. Cl. A61k 27/00
U.S. Cl. 424—274                 2 Claims

ABSTRACT OF THE DISCLOSURE

The invention relates to a method of preventing and treating oxalic lithiasis and a pharmaceutical composition therefor.

Said method comprises orally administering an effective amount of such a composition whose essential active substance is succinimide.

Oxalic lithiasis yields gradually within 4 to 6 weeks of treatment.

---

The invention relates to a method for the prevention or cure of oxalic lithiasis of human beings. The invention relates also to a new composition of matter to be used for the same purposes.

Oxalic lithiasis is a kindly disorder due to the precipitation of the calcium salt of oxalic acid in the kidney and/or bladder. As is known, the precipitation of calcium oxalate is more likely to occur if the urine is alkaline and oxalic lithiasis can occur if the pH of the urine is greater than 6.

It is therefore desirable to reduce or eliminate the danger of precipitation and to alleviate the disorders resulting from the precipitation and accumulation of calcium oxalate crystals. The crystals often cause nephritic colics, which are particularly painful since the oxalic calculi are covered with cutting edges.

The conventional means of treating this disorder are extremely limited. They include: a diet containing restricted amounts of food producing oxalate or containing carbohydrates and only minor supplies of calcium, the administration of phosphoric acid or ammonium chloride for acidifying the urine, and the administration of magnesium salts. These methods are often of doubtful efficiency, as stated in the specialised literature. Even if the extreme method of surgically removing the calculi is adopted, they tend to re-form unless the diet and the pH of the urine are corrected.

The problem is therefore to discover a compound which can reduce the rate of elimination of oxalic acid by the urine below the level at which the crystals are precipitated, by acting on the metabolic changes and reducing the formation of oxalic acid and of glyoxylic and glycolic acids, which give rise to oxalic acid.

The novel drug according to the invention for the prevention or cure of oxalic lithiasis is characterised in that it contains succinimide as the active substance.

The invention has shown that this chemical compound, which is known and clearly defined, satisfies the aforementioned requirements to a surprising extent.

As is known, the empirical formula of succinimide is $C_4H_5NO_2$, its structural formula is

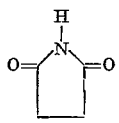

and its molecular weight is 99.09. The product can be obtained in a solid crystalline form which is very soluble in water (approximately 1 g. in 3 ml.) and has the further advantage of being very stable, even up to its boiling point (287–289° C.) where it decomposes only slightly.

The specific action of succinimide according to the invention, when administered in therapeutic doses, generally consists in a reduction in the rate of elimination of oxalic acid by the urine to a level below that at which calcium oxalate is precipitated. Succinimide also has very low toxicity, so that it can be used according to the invention in human medicine, more particularly for the prevention and treatment of oxalic renal lithiasis.

The following tests show the effect of succinimide when used according to the invention as a drug for the treatment of oxalic lithiasis.

PHARMACODYNAMIC TESTS

(1) Toxicity (a) The acute toxicity of succinimide is low. When orally administered, the average lethal dose or $LD_{50}$ is 11 g./kg. for the mouse and 14 g./kg. for the rat.

(b) The chronic or sub-acute toxicity is negligible. The administration of daily doses of 1 g./kg. and 3 g./kg. respectively to the rat for 3 months did not result in any observable clinical disorder, any change in the rate of weight increase, any death, any blood disorder, any deterioration or lesion in the liver, kidneys or supra-renals, or any effect on the quantity of sugar in the blood or the formation of urea.

(2) The effect on experimental lithiasis

In a number of experiments, animals were given ammonium glyoxylate to induce experimental lithiasis. Glyoxylic acid is one of the substances producing oxalic acid in the metabolic changes giving rise to the latter substance.

In the tests, the male adult rat was subcutaneously injected with an aqueous solution containing 4% of polyvinyl pyrrolidone and at a rate of 50 mg./kg. of glyoxylic acid in the form of ammonium glyoxylate. The injections were given daily for 18 days to the control animals as well as to the animals treated. The latter were also given 1 g./kg. of succinimide orally for the same period.

The proportion of oxalic acid in the kidney tissue was determined, and the kidneys of the controls and the treated animals were histologically examined. The average results showed a significant difference in favour of treatment with succinimide.

The rats which had been given ammonium glyoxylate to induce experimental lithiasis were killed after 18 days. The average content of oxalic acid in their kidneys was found to be 0.088 mg. in the control animals but only 0.070 mg. in the lot of animals which also received oral daily doses of 1 g./kg. of succinimide, corresponding to an approximately 20% reduction in the oxalate ion.

(3) Side effects (a) On aqueous diuresis.—It has been found according to the invention that the oral administration of 1 g./kg. doses of succinimide to the male or female adult rat results in a slight increase in aqueous diuresis, the increase usually being about 25%. This side effect is beneficial, since it corresponds to dilution of the oxalic acid.

(b) On the formation of urea.—There was no significant variation in the urea content of the blood of male adult rabbits between the time when 1 g./kg. of succinimide had been orally administered and 2 and 4 hours afterwards.

(c) On the regulation of the cardiovascular and respiratory systems.—Tests were made on the male adult rat which was anesthetised with sodium 5-ethyl-5-(1-methyl-butyl)-barbiturate (Nembutal) and was then given 1 g./kg. of succinimide by gastric administration. There were no observable effects on the cardiac rhythm, the electrocardiogram, the arterial tension, or the rhythm, amplitude and rate of respiration.

The pharmacodynamic tests therefore indicate that succinimide, when administered in therapeutically active

EXAMPLE 1

Powder

A dry, perfectly homogeneous mixture was prepared and packed in hermetically sealed bags, each containing the following quantities: